United States Patent
Fraenkel et al.

(10) Patent No.: US 10,516,578 B2
(45) Date of Patent: Dec. 24, 2019

(54) INFERRING A NETWORK TOPOLOGY

(71) Applicant: ENTIT Software LLC, Sunnyvale, CA (US)

(72) Inventors: Noam Fraenkel, Yehud (IL); Doron Shaked, Haifa (IL); Maya Cohen Harel, Ness Ziona (IL)

(73) Assignee: Micro Focus LLC, Santa Clara, CA (US)

(*) Notice: Subject to any disclaimer, the term of this patent is extended or adjusted under 35 U.S.C. 154(b) by 51 days.

(21) Appl. No.: 15/558,659

(22) PCT Filed: Mar. 31, 2015

(86) PCT No.: PCT/US2015/023491
§ 371 (c)(1),
(2) Date: Sep. 15, 2017

(87) PCT Pub. No.: WO2016/159968
PCT Pub. Date: Oct. 6, 2016

(65) Prior Publication Data
US 2018/0115465 A1    Apr. 26, 2018

(51) Int. Cl.
*G06F 15/173* (2006.01)
*H04L 12/24* (2006.01)

(52) U.S. Cl.
CPC ............ *H04L 41/142* (2013.01); *H04L 41/12* (2013.01); *H04L 41/145* (2013.01); *H04L 41/16* (2013.01)

(58) Field of Classification Search
USPC ....................................................... 709/223
See application file for complete search history.

(56) References Cited

U.S. PATENT DOCUMENTS

| | | | |
|---|---|---|---|
| 6,907,430 B2* | 6/2005 | Chong | G06F 21/577 |
| 6,978,302 B1* | 12/2005 | Chisholm | H04L 41/0213 370/242 |
| 7,012,934 B1* | 3/2006 | Nisbet | H04J 3/0647 370/503 |
| 7,076,397 B2 | 7/2006 | Ding et al. | |
| 7,103,008 B2* | 9/2006 | Greenblat | G06F 15/78 370/258 |
| 7,271,747 B2* | 9/2007 | Baraniuk | G06K 9/0057 341/50 |
| 7,317,693 B1 | 1/2008 | Roesch et al. | |
| 7,343,524 B2* | 3/2008 | Klotz | H04L 41/12 714/25 |

(Continued)

OTHER PUBLICATIONS

International Searching Authority, International Search Report and Written Opinion, dated Mar. 2, 2016, 10 pgs.

(Continued)

*Primary Examiner* — Alicia Baturay

(57) ABSTRACT

In a method for inferring a topology of components in a network, at least one operation parameter is provided for each of a plurality of components in a network, and a similarity measure is computed between at least two of said components based on values of said operation parameters. Based on said similarity measure, it is determined whether said two components are topologically connected, wherein said similarity measure is computed in terms of a normalized mutual information between said operation parameters pertaining to said two components.

20 Claims, 5 Drawing Sheets

(56) References Cited

U.S. PATENT DOCUMENTS

| | | | |
|---|---|---|---|
| 7,349,348 B1* | 3/2008 | Johnson | H04L 29/12339 370/254 |
| 7,352,706 B2* | 4/2008 | Klotz | H04L 41/12 370/241 |
| 7,509,405 B2* | 3/2009 | Hubbard | H04L 29/06 709/223 |
| 7,511,643 B2* | 3/2009 | Baraniuk | G06K 9/0057 341/50 |
| 7,535,911 B2* | 5/2009 | Bejerano | H04L 12/462 370/395.31 |
| 7,664,089 B2* | 2/2010 | Zhao | H04W 74/02 370/338 |
| 7,889,680 B2* | 2/2011 | Chan | H04L 41/12 370/255 |
| 7,904,086 B2* | 3/2011 | Kundu | H04W 36/30 455/436 |
| 7,969,908 B2* | 6/2011 | Ballantyne | H04L 41/12 370/254 |
| 8,089,904 B2* | 1/2012 | Balasubramaniam | H04L 41/12 370/254 |
| 8,194,573 B1* | 6/2012 | Smith | H04W 8/005 370/255 |
| 8,670,352 B2* | 3/2014 | Uppalli | H04L 12/4625 370/254 |
| 8,780,758 B2* | 7/2014 | Bukofser | H04L 41/12 370/232 |
| 8,812,566 B2* | 8/2014 | Aizman | G06F 16/188 707/827 |
| 8,856,926 B2* | 10/2014 | Narayanaswamy | H04L 63/1425 726/23 |
| 8,995,443 B2* | 3/2015 | Schrum, Jr. | H04L 61/103 370/392 |
| 9,021,086 B2* | 4/2015 | Wolcott | H04L 41/12 324/527 |
| 9,065,554 B2* | 6/2015 | Wolcott | H04B 3/50 |
| 9,178,778 B2* | 11/2015 | Meloche | H04L 41/5067 |
| 9,325,748 B2* | 4/2016 | Jain | H04L 41/069 |
| 9,325,805 B2* | 4/2016 | Shattil | H04L 67/327 |
| 9,350,601 B2* | 5/2016 | Jain | H04L 41/0654 |
| 9,350,670 B2* | 5/2016 | Ko | H04W 40/24 |
| 9,356,797 B2* | 5/2016 | Werner | H04L 12/2838 |
| 9,553,775 B2* | 1/2017 | Bowler | H04L 41/22 |
| 9,596,092 B2* | 3/2017 | Kapur | H04L 12/10 |
| 9,654,372 B2* | 5/2017 | Lumezanu | H04L 43/106 |
| 9,668,197 B2* | 5/2017 | Zhang | H04W 40/246 |
| 9,712,415 B2* | 7/2017 | Groenendijk | H04L 41/5035 |
| 9,755,942 B2* | 9/2017 | Leogrande | H04L 43/14 |
| 9,923,767 B2* | 3/2018 | Dickey | H04L 41/0816 |
| 10,127,273 B2* | 11/2018 | Dickey | G06F 16/24568 |
| 2003/0097693 A1 | 5/2003 | Morohashi et al. | |
| 2003/0110250 A1* | 6/2003 | Schnitzer | H04L 41/142 709/224 |
| 2004/0054776 A1* | 3/2004 | Klotz | H04L 41/06 709/224 |
| 2004/0155899 A1* | 8/2004 | Conrad | H04L 41/12 715/736 |
| 2005/0041656 A1* | 2/2005 | Dubois | H04L 41/0213 370/389 |
| 2009/0024549 A1 | 1/2009 | Johnson | |
| 2009/0116413 A1 | 5/2009 | George | |
| 2010/0027911 A1 | 2/2010 | Lefebvre et al. | |
| 2013/0077891 A1 | 3/2013 | Nimnual et al. | |
| 2013/0103822 A1 | 4/2013 | Wolcott et al. | |
| 2014/0222745 A1 | 8/2014 | Deng et al. | |
| 2014/0254428 A1 | 9/2014 | Visser et al. | |
| 2018/0091359 A1* | 3/2018 | Alon | H04L 41/12 |
| 2018/0191471 A1* | 7/2018 | Elhaddad | H04L 1/24 |

OTHER PUBLICATIONS

Taehyong, K., Network Analysis by Topological Properties and Computational Modeling (identifying Critical Locations and Dynamic Behaviors in Biological and Epidemiological Networks), 2012, 4 pages.

* cited by examiner

INFERRING A NETWORK TOPOLOGY

BACKGROUND

Topology, in information technology (IT) management terms, characterizes the way computers, network devices, software components, computer systems, etc. are connected in an IT network or environment. Topological information is paramount in providing sophisticated information technology management capabilities and analysis, such as change management, event management, problem resolution, and operation analysis.

DETAILED DESCRIPTION

Figure 1:
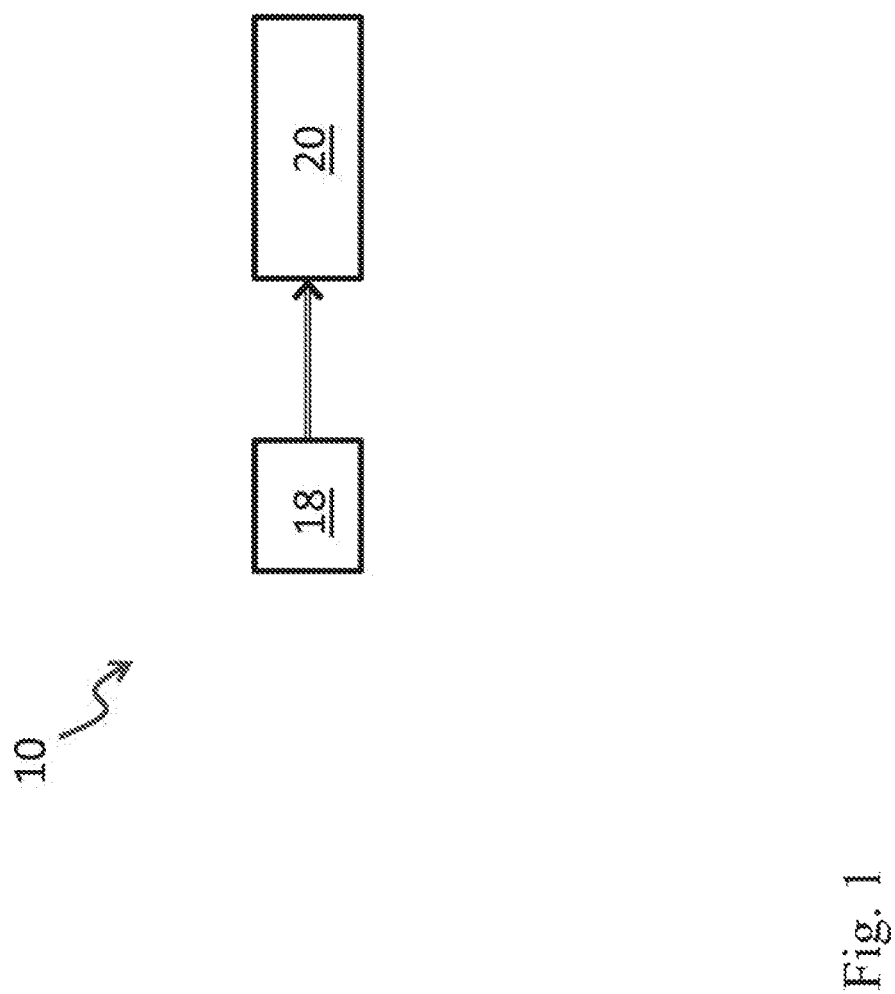
FIG. 1 illustrates a system according to an example.

Establishing and maintaining the topological model of the network environment may be intricate and difficult, in particular for large networks. Some common techniques include IP scans, port scans, sniffing network communication, probing life systems for known ports, or scanning file systems and configuration files. A common trait of these methods is that they may be active processes that are initiated solely for the purpose of discovering the environment, and these processes may run periodically, or even constantly, if real-time updates are desired, and may require considerable configuration, maintenance and management resources.

Accordingly, the present disclosure provides examples of methods and systems which may, in some examples, allow inferring a topology of components in a network with less effort and resources.

In an example, a method for inferring a topology of components in a network comprises providing at least one operation parameter for each of a plurality of components in a network, computing a similarity measure between at least two of said components based on values of said operation parameters, and determining whether said two components are topologically connected in said network based on said similarity measure. Said similarity measure is computed in terms of a normalized mutual information between said operation parameters pertaining to said two components.

Normalized mutual information may, in some examples, yield reliable traces of the topology of the components in a network based on statistical data of operation parameters collected from the plurality of components in the network. In particular, mutual information may allow to leverage data already collected and maintained in many IT management applications to infer and maintain the topology model of the network with minimal additional resources and investment.

Mutual information is generally known in information theory as a measure to quantify the resemblance of probability distributions, and corresponds to the relative entropy between the joint distribution and the product distribution. This measure may reliably be used in the context of network analysis with a large variety of different input data, and hence is versatile and may provide a particularly reliable and sound assessment of the network topology based on the leverage data that is available for the components in a given network.

In the sense of the present disclosure, components may be understood to refer to any units or entities that provide operation parameters that can be monitored. In an IT environment, these may typically be network devices, computer systems, or software components.

A network, in the sense of the present disclosure, denotes connections or links between the components. The links may correspond to a wired or wireless connection between the components. However, the links may also be virtual links in the sense that they merely indicate some correlation or synchronization of components in the network, or synchronization in the way these components work.

A network may generally be represented in terms of a graph, with the nodes of the graph corresponding to the components and the edges corresponding to the connections or links. A graph represents a certain topology, and the present disclosure is concerned with inferring the topology, i.e. the connections, based on an analysis of the operation parameters that are available from the components.

In some examples, the normalization of the mutual information may enhance the suitability of the mutual information as similarity measure.

In particular, in some examples, said mutual information may be normalized with a joint entropy of said operation parameters pertaining to said two components, in particular by dividing said mutual information by said joint entropy.

In some examples, normalization with the joint entropy allows to provide a bounded similarity measure.

The normalization may also comprise a normalization factor over a sum of said mutual information, said sum over said components.

Normalization by dividing the mutual information by a sum of mutual information, over at least part of said components, allows to reduce the adverse effect of random processes or, conversely, monotone signals on the similarity measure.

In an example, a plurality of operation parameters may be provided.

As assessment of the similarity based on a plurality of operation parameters may enhances the accuracy.

In general, said similarity measure, in particular said mutual information, may involve a comparison of different operation parameters relating to different devices. For instance, a similarity may be determined between a processor reading of the first device, and error statistics of a second device.

However, in some examples, said mutual information is given in terms of corresponding or the same operation parameters pertaining to said two components.

In an example, said similarity measure is computed in terms of a weighted normalized mutual information.

Weights may be assigned to said operation parameters.

With a suitable weighting, accidental synchronized behavior that might otherwise distort the results can be efficiently suppressed.

Said weights of said weighted mutual information may be given in terms of a probability distribution.

In some examples, said weights of said weighted mutual information are given in terms of a standard deviation of said mutual information, and/or a median of said mutual information.

In particular, contributions in the similarity measure for the mutual information of operation parameters that deviate significantly from the standard deviation or median may be suppressed with small weights. This may allow to reduce the effect of accidental synchronized behavior, which might otherwise be overemphasized by the normalization.

The operation parameters may correspond to any kind of values or readings that are available for the component, such as performance metrics, logs, or events. In some examples, a large variety of operation parameters can be employed to infer the network topology, regardless of the nature of these parameters.

For instance, in case the components in the network are computing devices, the operation parameters may correspond to readings of processors, to job statistics, to parameters quantifying a memory allocation, or to error statistics. Providing said operation parameters may involve counting events or measurement data collected from said components in time slots.

Providing said plurality of operation, parameters may also comprise counting relative frequencies, and/or assigning a probability distribution to said operation parameters.

In this sense, an operation parameter may be understood to comprise a collection of values, and an associated probability distribution.

In some examples, said normalized mutual information pertaining to a pair of components (i,j) and operation parameters (k,l) is given as $$tr(M_i^k, M_j^l) := \frac{NMI(M_i^k, M_j^l)}{\Sigma_i NMI(M_i^k, M_j^l) \times \Sigma_j NMI(M_i^k, M_j^l)}, \quad (1)$$

wherein $$NMI(M_i^k, M_j^l) := \frac{I(M_i^k, M_j^l)}{H(M_i^k, M_j^l)}, \quad (2)$$

wherein $M_i^k$ and $M_j^l$ denote said operation parameters and associated probability distributions for said components (i, j), I(X,Y) denotes a mutual information of variables X and Y, and H(X,Y) denotes a joint entropy of said variables X and Y.

In Equation (2), NMI denotes a mutual information I normalized by the joint entropy H. As can be taken from Equation (1), a normalized mutual information is then again normalized with two normalization factors, when each of the normalization factors is a sum of a normalized mutual information over components i and j, respectively.

In some examples, said similarity measure between a pair of components (i,j) is given as $$S_{i,j} := \Sigma_k \Sigma_l w_{k,l} tr(M_i^k, M_j^l), \quad (3)$$

wherein $w_{k,l}$ denote said weights.

The weights $w_{k,l}$ correspond to a probability distribution over operation parameters (k,l).

In particular, one may choose a diagonal distribution, i.e., $$w_{k,l} = w_k \delta_{k,l} \quad (4)$$

wherein $w_k$ denotes a set of weights, and $\delta_{k,l}=1$ if k=l, and $\delta_{k,l}=0$ otherwise.

The inventors found that merely taking into account corresponding operation parameters of different components (rather than cross terms) allows for a particularly efficient computation of the similarity measure, and still provides a reliable assessment of the network topology.

In some examples, determining whether said two components are topologically connected in said network comprises comparing said similarity measure against a predetermined threshold value.

Said threshold value may be a threshold value that depends on the pair of components (i, j) under consideration, or may alternatively be a universal threshold value.

The disclosure also relates to a system lot inferring a topology of components in a network, said system comprising a receiving unit to receive at least one operation parameter for each of a plurality of components in a network and a computing unit to compute a similarity measure between at least two of said components based on values of said operation parameters. Said computing unit determines whether said two components are topologically connected in said network based on a similarity measure, and said computing unit computes said similarity measure in terms of a normalized mutual information between said operation parameters pertaining to said two components.

Said system, in particular said computing unit, may be adapted to implement a method with some or all of the features described above.

The present disclosure further relates to a computer program or to a computer program product comprising computer-readable instructions, such that, when said instructions are run on a computing device connected to a system with some or all of the features described above, implement on said system a method with some or all of the features described above.

Implementing examples will now be described in greater detail with reference to the accompanying drawings.

FIG. 1 illustrates a system 10 for inferring a topology of a network according to an example of the disclosure. The system 10 comprises a receding unit 18 to receive at least one operation parameter for each of the plurality of the components in a network, and a computing unit 20 to compute a similarity measure between at least two of said components based on values of said operation parameters. Said values of said operation parameters may be provided to the computing unit 20 by the receiving unit 18, as indicated by the arrow in FIG. 1.

Figure 2:
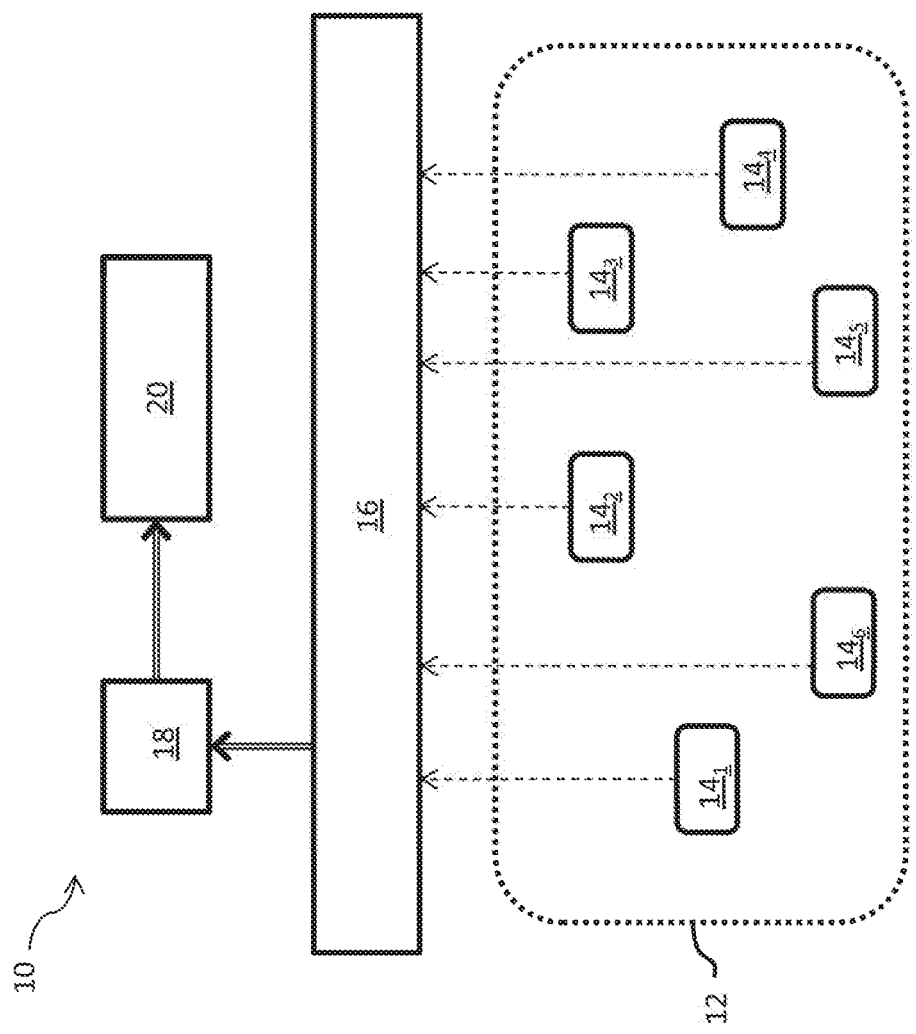
FIG. 2 is a schematic diagram of a network environment in which the method and system according to an example of the present disclosure may be employed.

FIG. 2 illustrates the system 10 according to an example in conjunction with a network 12 and a network monitoring unit 16.

The network 12 comprises a plurality of network components $14_1$ to $14_6$. For instance, the network 12 may be a computer network in an office environment, and the network components $14_1$ to $14_6$ may comprise desktop computers that are distributed in the computing network 12. However, the present disclosure is not so limited and can generally be applied to any kind of network and network components.

FIG. 2 shows a small network 12 with six network components $14_1$ to $14_6$. However, it will be understood that this is a mere example chosen for the ease of presentation, and in general the present disclosure may be applied to large networks with possibly hundreds of network components, or any number of network components. In fact in some examples the method according to the present disclosure provides an efficient characterization of the network topology in large networks with many network components.

The components $14_1$ to $14_6$ may be interconnected in the network 12 in various ways, such as by wire over individual direct connections or via a communication bus, or wirelessly. The connections may indicate a flow of communication between the network components $14_1$ to $14_6$. For the ease of presentation, the network links/connections are not shown in FIG. 2. In some applications, these connections may be unknown, and in one example it may be the objective of the present disclosure to derive or determine the connections by monitoring the network components $14_1$ to $14_6$.

In another example, the physical network connections between the network components $14_1$ to $14_6$, may be known, but may be insufficient or inappropriate to characterize the correlations in the operations of the network components $14_1$ to $14_6$, or may not properly represent these correlations.

As can be taken from FIG. 2 the network components $14_1$ to $14_6$ provide surveillance data or monitoring data (indicated by dashed arrows) to a network monitoring unit 16. The surveillance data may comprise data that is routinely collected and maintained in many conventional IT management applications. In case the network components $14_1$ to $14_6$ are computing units, the surveillance data may relate to logs, events, or performance metrics which may take numerical, categorical or Boolean values. For instance, surveillance data may relate to a processor load of a central processing unit (CPU) of the computing units $14_1$ to $14_6$, to memory allocation, job statistics, or error statistics. In some examples the present disclosure allows to process a large variety of surveillance data and employ them for determining a similarity measure, irrespective of the nature and meaning of this data. Each network component $14_1$ to $14_6$ may provide a single operation parameter, or a plurality of operation parameters.

As can be taken from FIG. 2, the receiving a unit 18 is adapted to receive a pre-determined selection of surveillance parameters from the network mounting unit 16, and forwards this data to the computing unit 20 which in turn computes a similarity measure between at least a pair of network components $14_1$ to $14_6$ based on the surveillance parameters.

FIG. 1 and 2 show the receiving unit 18 and the computing unit 20 of the system 10 as two separate units. However, in other examples these units could also be combined into a single unit, or could be integrated into a conventional network monitoring unit 16.

Figure 3:
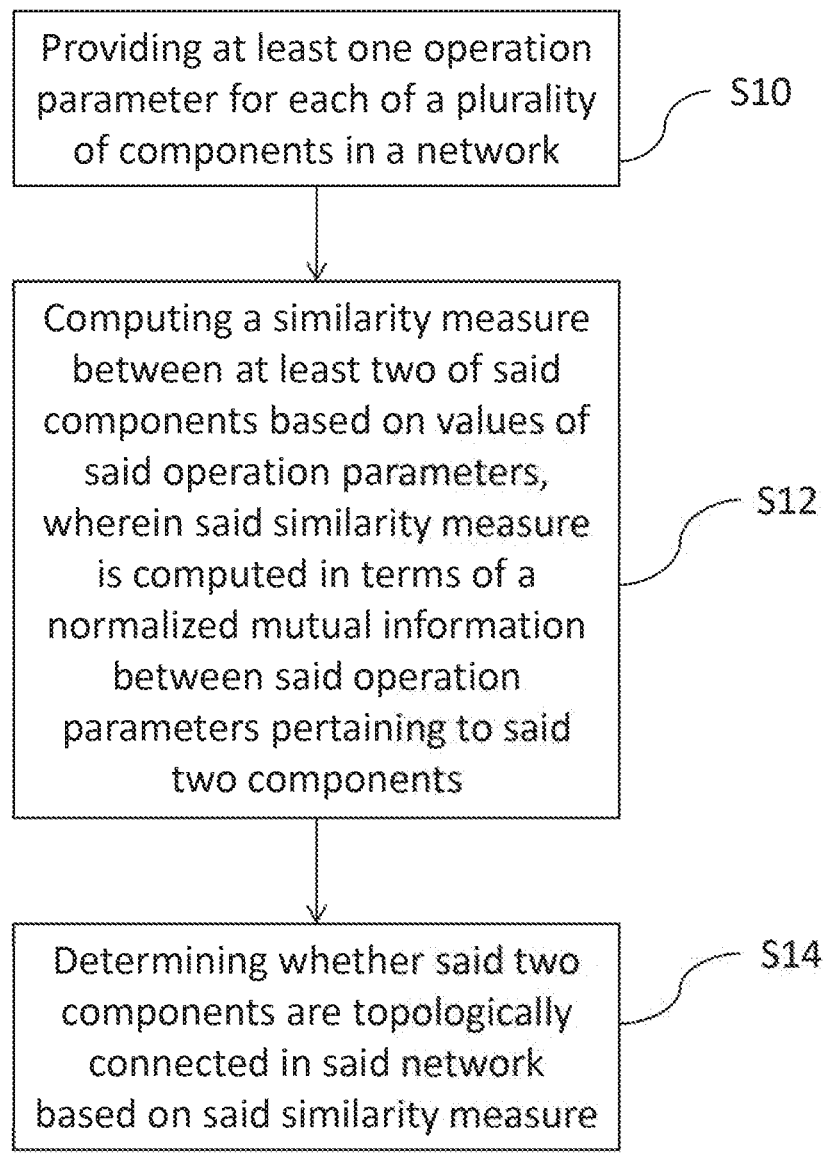
FIG. 3 is a flow diagram for illustrating an example of a method for inferring a topology of components in a network.
Figure 4:
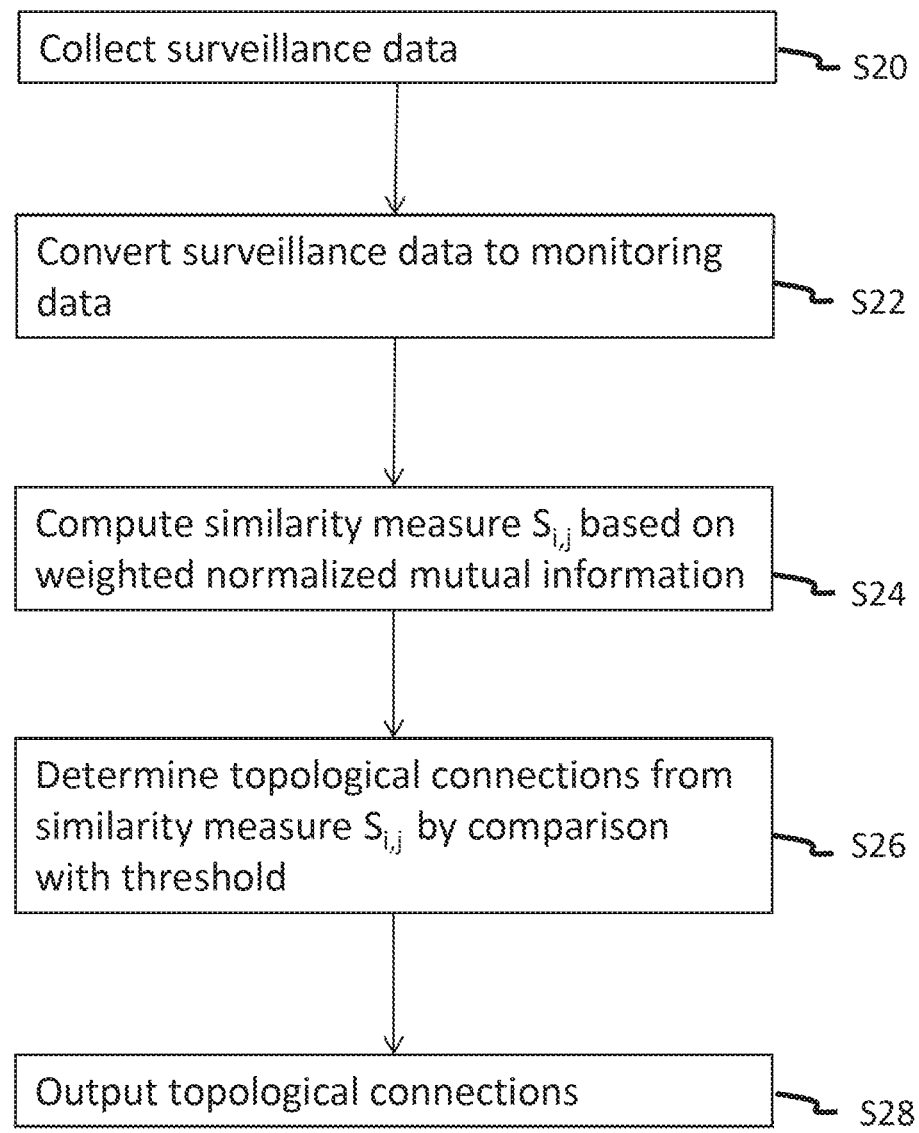
FIG. 4 is a flow diagram for illustrating another example of a method for inferring a topology of components in a network.

Methods of computing a similarity measure between at least two network components $14_1$ to $14_6$ based on the surveillance data according to an example of the present disclosure will now be described with reference to the flow diagrams of FIG. 3 and 4.

In S10, at least one operation parameter for each of a plurality of components in a network may be provided.

In S12, a similarity measure between at least two of said components based on values of said operation parameters may be computed. Said similarity measure may be computed in terms of a normalized mutual information between said operation parameters pertaining to said two components.

In S14, it may be determined whether said two components are topologically connected in said network based on said similarity measure.

An example of a method, of computing the similarity measure based on surveillance data received from the network components $14_1$ to $14_6$ of the network 12 will now be described in greater detail with reference to the flow diagram of FIG. 4.

In S20, the computing unit 20 may collect suitable surveillance parameters provided from the network components $14_1$ to $14_6$ via the network monitoring unit 16. As described above, the surveillance data may comprise a large variety of values and data formats, such as numeric, categorical or Boolean values.

In S22, in order to reduce this inherent complexity, the surveillance data may be converted to monitoring data, such as by counting events in given predetermined time slots. This pre-processing results in a plurality of operation parameters $M_i^k$, wherein i=1, . . . , N denotes the network components (in this case N=6), and k=1, . . . , P denotes the various parameters that are monitored.

The pre-processing S22 may also involve assigning probability distributions to each of the operation parameters $M_i^k$, such as based on a priori information or based on relative frequencies obtained from counting said events in said time slots.

Based on the monitoring data in S24, the computing unit 20 computes the similarity measure $S_{i,j}$ between pairs of components i, j=1, . . . , N based on a weighted normalized mutual information, as will be described in further detail below.

An underlying idea of the method is that when systems and components are connected with one another and interacting with one another in a network 12, these interactions will leave identifiable traces in the collected surveillance data. Similarly to a disturbance analysis, if network components $14_1$ to $14_6$ are connected in a topology, then a disturbance occurring in one of them will often cause a related disturbance in a connected component. In some examples, a weighted normalized mutual information is suitable to reveal these kind of connections and similarities. On the one hand, mutual information is agnostic to the type of monitoring data, and on the other hand is superior to correlation techniques that may assume an underlying linear monitor dependence.

Assuming two random variables X and Y with a joint probability distribution p(x,y) and marginal probability distributions p(x) and p(y), the mutual information I(x,y) may be defined as $$I(X, Y) = \Sigma_x \Sigma_y p(x, y) \log \frac{p(x, y)}{p(x)p(y)} \tag{5}$$

Alternatively, the mutual information may be understand to denote a relative entropy between the joint distribution p(x,y) and the product distribution p(x)×p(y).

The mutual information may be expressed in terms of the entropy $$H(X) = -\Sigma_x p(x) \log p(x) \tag{6}$$

as follows:

$$I(X,Y) = H(X) + H(Y) - H(X,Y) \tag{7}$$

The mutual in format ion I(X,Y) is non-negative, but is not a priori bounded. Good results can be obtained by normalizing mutual information to the unit interval by dividing by the joint entropy, $$NMI(X, Y) := \frac{I(X, Y)}{H(X, Y)} \tag{8}$$

Signals that may have many different values such as random noise contributions or conversely monotone signals, typically have a high entropy, and their normalized mutual information NMI with any other signal is approximately the entropy of that other signal. Hence, when a given monitor has both varied and non-varied signals, the varied normalized mutual information dominates. These issues can be overcome, and good results can be obtained by further normalizing NMI by dividing by the sum of normalized mutual information over the respective components i and j, respectively.

Hence, for operation parameters $M_i^k$, where k denotes the monitors and i denotes the components, we define $$tr(M_i^k, M_j^l) := \frac{NMI(M_i^k, M_j^l)}{\Sigma_i NMI(M_i^k, M_j^l) \times \Sigma_j NMI(M_i^k, M_j^l)} \quad (9)$$

Based on the normalized mutual information given in Equation (9), a similarity measure that quantifies the similarity or connection or resemblance between the pair of components i, j may be given as $$S_{i,j} := \Sigma_k \Sigma_l w_{k,l} tr(M_i^k, M_j^l) \quad (10)$$

wherein, $w_{k,l}$ denote the probability distribution of weights.

The weights may, for example, be chosen to suppress pairs of operation parameters with accidental synchronized behavior.

Equation (10) provides a similarity measure based on all combinations of pairs of operation parameters $M_i^k$, $M_j^l$, k,l=1, ... P. However, a reliable assessment of the network topology can be achieved by comparing corresponding or identical operation parameters for different network components, thereby achieving a significant reduction of the complexity.

Hence, for example, $$S_{i,j} = \Sigma_k w_k \, tr(M_i^k, M_j^k) \quad (11)$$

wherein $$tr(M_i^k, M_j^k) := \frac{NMI(M_i^k, M_j^k)}{\Sigma_i NMI(M_i^k, M_j^k) \times \Sigma_j NMI(M_i^k, M_j^k)} \quad (12)$$

As described above, the weights $w_k$ can be chosen with a view to suppress accidental synchronized behavior that may be observed in some operation parameters, for instance by taking into account the standard deviation $S_k$ of all terms $tr(M_i^k, M_j^k)$, computing the median μ of all standard deviations $S_k$, and defining a parabola through (0,0) and through (μ, 1) as a raw weight factor:

$$v_k := \max\{0_1, S_k \cdot (2\mu - S_k)\} \quad (13)$$

The weight factors $w_k$ may then be obtained from normalization, $$w_k := \frac{v_k}{\Sigma_k v_k} \quad (14)$$

In case a single operation parameter k is provided per component, i.e., P=1, there is a single weight $w_k=1$.

Once the similarity measure $S_{i,j}$ has been computed, the computing unit 20 may determine whether two given components i,j are topologically connected in S16 based on a comparison with a pre-determined threshold.

For instance, the components i,j may be determined to be connected if and only if $S_{i,j} \geq \theta$, for some given threshold θ.

The results may be output in S28, such as in the form of a list of connections or a graph of connections.

Figure 5:
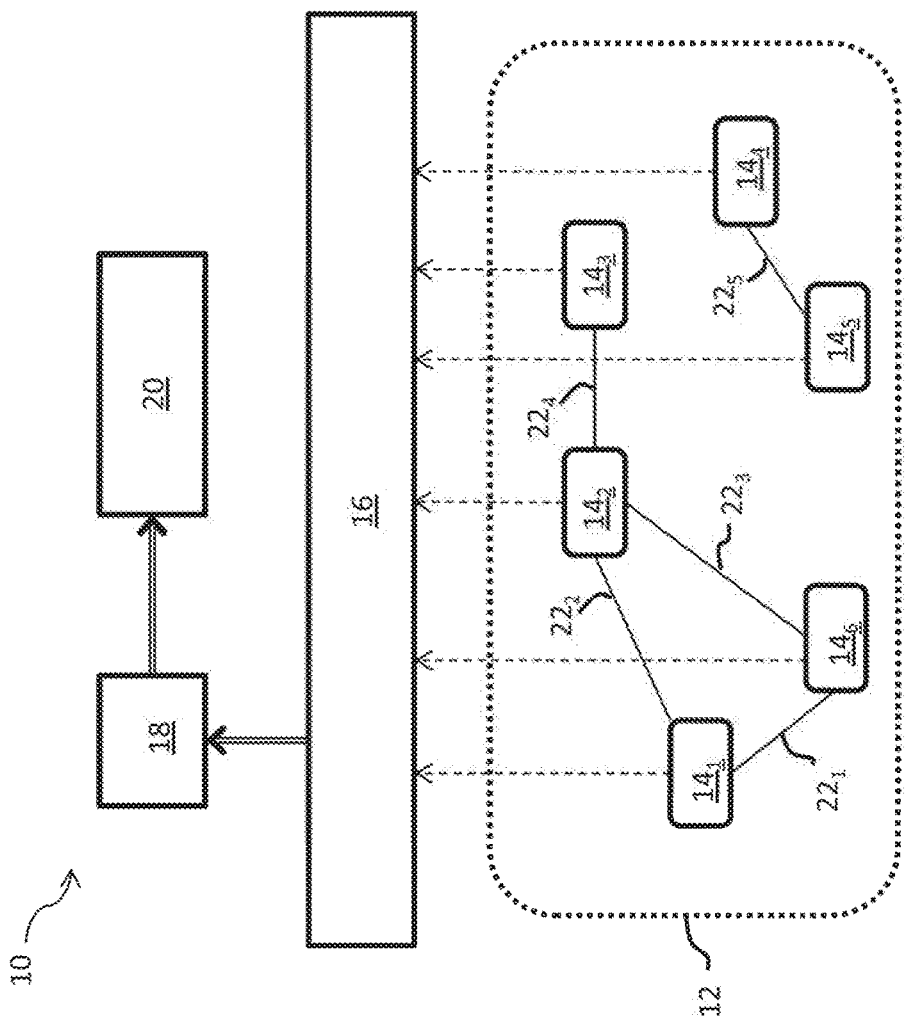
FIG. 5 is a schematic diagram of the network environment in FIG. 2, but in addition shows the discovered network connections according to an example.

Resulting topological connections that may be the outcome of the method according to the present disclosure are illustrated in FIG. 5.

FIG. 5 largely corresponds to FIG. 2, but in addition shows respective connections 22$_1$ to 22$_5$ (represented by solid lines) between the network components 14$_1$ to 14$_6$ whenever the computing unit 20 determines that the corresponding similarity measure between these components is no smaller than the pre-determined threshold θ.

in the example of FIG. 5, one can identify two sub-groups of components, a first sub-group comprising the network components 14$_1$, 14$_2$, 14$_3$ and 14$_6$, and a second sub-group comprising the network components 14$_4$ and 14$_5$. None of the network components in the first sub-group is connected to any of the network components in the second sub-group and vice-versa.

Among the network components in the first sub-group, the network components 14$_1$, 14$_2$, and 14$_6$ are all interconnected, whereas the remaining network component 14$_3$ is connected (via a connection 22$_4$) to the network component 14$_2$ but not to other network components.

The method according to the disclosure hence may provide helpful and valuable insight on the topological connections of the given computing system based on monitoring data.

The computing unit 20 may be implemented on a desktop or laptop computer, but may also be integrated into a conventional network monitoring unit 16.

The techniques described above were applied on data from 64 different performance metrics over a test period of eight servers and five weeks. The eight seizes worked in two clusters of four, wherein each cluster was split between two different data centers. In the test network, different stages of a job were run on different servers, and all stages used a meta data service. To discover the topology, the data was split into five week-long sets, and it was found that all the clusters and the two sub-clusters could be identified correctly. The number of inter-cluster links that were missed, i.e. not identified, as well as the number of erroneous links, was negligible.

The description of the examples and the Figures are merely illustrative, and should not be understood to imply any limitation. The scope of the present disclosure is to be determined solely from the appended claims.

REFERENCE SIGNS

10 system for inferring a network topology
12 network
14$_1$-14$_6$ network components of network 12
16 network monitoring unit
18 receiving unit
20 computing unit
22$_1$-22$_5$ topological connections between network components 14$_1$-14$_6$

The invention claimed is:

1. A method for inferring a topology of components in a network, comprising:
   providing at least one operation parameter for each of a plurality of components in a network;
   computing a similarity measure between two of said component based on values of said operation parameters; and
   determining whether said two components are topologically connected in said network based on said similarity measure; wherein said similarity measure is computed in terms of a normalized mutual information between said operation parameters pertaining to said two components.

2. The method according to claim 1, wherein said normalized mutual information is obtained by normalizing with a joint entropy of said operation parameters pertaining to said two components.

3. The method according to claim 1, wherein said normalized mutual information is obtained by normalizing over a sum of mutual information, said sum over said components.

4. The method according to claim 1, wherein said normalized mutual information is a weighted normalized mutual information.

5. The method according to claim 4, wherein weights of said weighted normalized mutual information are given in terms of a standard deviation or a median of said normalized mutual information.

6. The method according to claim 1, wherein providing said at least one operation parameter comprises assigning a probability distribution to said operation parameter.

7. The method according to claim 1, wherein said normalized mutual information pertaining to a pair of components (i,j) and operation parameters (k,l) is given as $$tr(M_i^k, M_j^l) := \frac{NMI(M_i^k, M_j^l)}{\Sigma_i NMI(M_i^k, M_j^l) \times \Sigma_j NMI(M_i^k, M_j^l)},$$

wherein $$NMI(M_i^k, M_j^l) := \frac{I(M_i^k, M_j^l)}{H(M_i^k, M_j^l)},$$

wherein $M_i^k$ denote said operation parameters and associated probability distributions for said components (i,j), I(X,Y) denotes a mutual information of variables X and Y, and H(X,Y) denotes a joint entropy of said variables X and Y.

8. The method according to claim 7, wherein said similarity measure between a pair of components (i,j) is given as $$S_{i,j} := \Sigma_k \Sigma_l w_{k,l} tr(M_i^k, M_j^l),$$

wherein $w_{k,l}$ denote said weights.

9. The method according to claim 8, wherein $$w_{k,l} := w_k \delta_{k,l},$$

wherein $w_k$ denotes a set of weights, and $\delta_{k,l} = 1$ if k=1, and $\delta_{k,l} = 0$ otherwise.

10. The method according to claim 1, wherein determining whether said two components are topologically connected in said network comprises comparing said similarity measure against a predetermined threshold value.

11. The method according to claim 1, wherein said operation parameters are parameters quantifying a status or operation of said components in said network.

12. The method according to claim 1, wherein said components are computing devices, and said network is a communication network linking said computing devices.

13. The method according to claim 1, further comprising: generating a topology comprising a plurality of connections between the plurality of components in the network.

14. A system for inferring a topology of components in a network comprising:
a receiving unit to receive at least one operation parameter for each of a plurality of components in a network; and
a computing unit to compute a similarity measure between two of said components based on values of said operation parameters;
wherein said computing unit determines whether said two components are topologically connected in said network by comparing said similarity measure with a pre-determined threshold value; and
wherein said computing unit computes said similarity measure in terms of a weighted and normalized mutual information between said operation parameters pertaining to said two components.

15. The system according to claim 14, wherein said computing unit obtains said weighted and normalized mutual information by normalizing with a joint entropy of said operation parameters pertaining to said two components.

16. A non-transitory computer-readable storage medium, comprising computer-readable instructions to implement a method comprising:
receiving at least one operation parameter for each of a plurality of components in a network;
computing a similarity measure between at least two of said components based on values of said operation parameters; and determining:
whether said two components are connected in said network by comparing said similarity measure with a threshold value;
wherein said similarity measure is computed in terms of a normalized mutual information between said operation parameters pertaining to said two components.

17. The non-transitory computer-readable storage medium of claim 16, wherein said normalized mutual information is obtained by normalizing with a joint entropy of said operation parameters pertaining to said two components.

18. The non-transitory computer-readable storage medium of claim 16, wherein said normalized mutual information is obtained by normalizing over a sum of mutual information, said sum over said components.

19. The non-transitory computer-readable storage medium of claim 16, wherein said normalized mutual information is a weighted normalized mutual information.

20. The non-transitory computer-readable storage medium of claim 16, comprising instructions to implement a method comprising:
generating a topology comprising a plurality of connections between the plurality of components in the network.

* * * * *